US007481116B1

(12) United States Patent
Osborn

(10) Patent No.: US 7,481,116 B1
(45) Date of Patent: Jan. 27, 2009

(54) DEVICE AND METHOD FOR MEASURING FAN VIBRATION

(75) Inventor: Jay K. Osborn, Arcata, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 202 days.

(21) Appl. No.: 11/582,654

(22) Filed: Oct. 18, 2006

(51) Int. Cl.
*G01M 1/22* (2006.01)
(52) U.S. Cl. .......................................... 73/660; 73/493
(58) Field of Classification Search .................... 73/660, 73/493, 514.01; 361/695
See application file for complete search history.

(56) References Cited

U.S. PATENT DOCUMENTS 3,195,034 A * 7/1965 Bensema .................... 318/460
6,289,735 B1 * 9/2001 Dister et al. ................... 73/579
7,303,140 B2 * 12/2007 Jones et al. .................. 361/695

* cited by examiner

*Primary Examiner*—John E Chapman
(74) *Attorney, Agent, or Firm*—Osha • Liang LLP

(57) ABSTRACT

An apparatus for measuring vibration of a fan includes a frame having an opening for enclosing a fan; a plurality of accelerometers disposed on the frame; and an elastic support for supporting the frame. An apparatus for measuring fan vibration includes a frame having an opening for enclosing a fan; a plurality of accelerometers disposed on the frame. The plurality of accelerometers output a signal to the signal-analyzing device and at least three of the plurality of accelerometers are disposed on a different surface of the frame from each other. The apparatus for measuring fan vibration includes a mounting block that allows the fan to be secured in the opening of the frame and an elastic support for supporting the frame. A method of measuring fan vibration includes disposing a plurality of accelerometers on a frame; mounting a fan within the frame; turning on the fan; and outputting a signal from each of the plurality of accelerometers to a signal-analyzing device.

19 Claims, 4 Drawing Sheets

DEVICE AND METHOD FOR MEASURING FAN VIBRATION

BACKGROUND

Hard disk drives (HDDS) in computer products are sensitive to external vibration, either from other devices or from sources outside the system. For example, the effect of external vibration on HDDs is to disturb the tracking of read/write heads on data tracks, to increase the track access time, and to reduce overall data transfer rates. Further, in case of a significant vibration, read performance and, especially, write performance of HDDs can be severely reduced. If the vibration becomes large enough, writing to HDD may be prevented and it may cause a failure of the system.

As computers, such as computer servers and storage systems, become more and more dense, the number of internal vibration sources has increased. Because these dense systems require more cooling, the energy to be put into internal cooling fans has increased in terms of the number of fans, total power of motor fan drive, and rotational speed of fans. In particular, fan speeds for the small systems have more than doubled in recent years. In the past, the only significant source of HDD vibration disturbance was other HDDs in the system. On the other hand, now, cooling fans have become the major cause of HDD performance problems in many systems.

The vibration sources within fans are many and variable. The most common cause of fan-induced HDD vibration sensitivity is fan torque ripple off and on the axis of fan rotation at frequencies above 300 Hz and especially above 500 Hz to 1 kHz or higher. Despite a common trend toward increasing vibration energy at increasing frequencies, different fan designs in consideration for a single system product may have very different spectrum characteristics. Also, the impact of even the same fan at different speeds is affected by fan motor characteristics, chassis structural response, and HDD servo response.

The impact of fans on HDD performance can be serious. Without adequate fan characterization methods, the impact is quite unpredictable. No commercial methods currently exist for the measurement of fan dynamics, especially for the vibration components on top of steady fan torque or for the components off the motor axis.

SUMMARY OF INVENTION

One or more embodiments of the present invention relate to an apparatus for measuring vibration of a fan comprising: a frame comprising an opening for enclosing a fan; a plurality of accelerometers disposed on the frame; and an elastic support for supporting the frame.

One or more embodiments of the present invention relate to an apparatus for measuring fan vibration comprising: a frame comprising an opening for enclosing a fan; a plurality of accelerometers disposed on the frame, wherein the plurality of accelerometers output a signal to the signal-analyzing device and wherein at least three of the plurality of accelerometers are disposed on a different surface of the frame from each other; a mounting block that allows the fan to be secured in the opening of the frame; and an elastic support for supporting the frame.

One or more embodiments of the present invention relate to a method of measuring fan vibration comprising: disposing a plurality of accelerometers on a frame; mounting a fan within the frame; turning on the fan; and outputting a signal from each of the plurality of accelerometers to a signal-analyzing device. Other aspects and advantages of the invention will be apparent from the following description and the appended claims.

DETAILED DESCRIPTION

Figure 1:
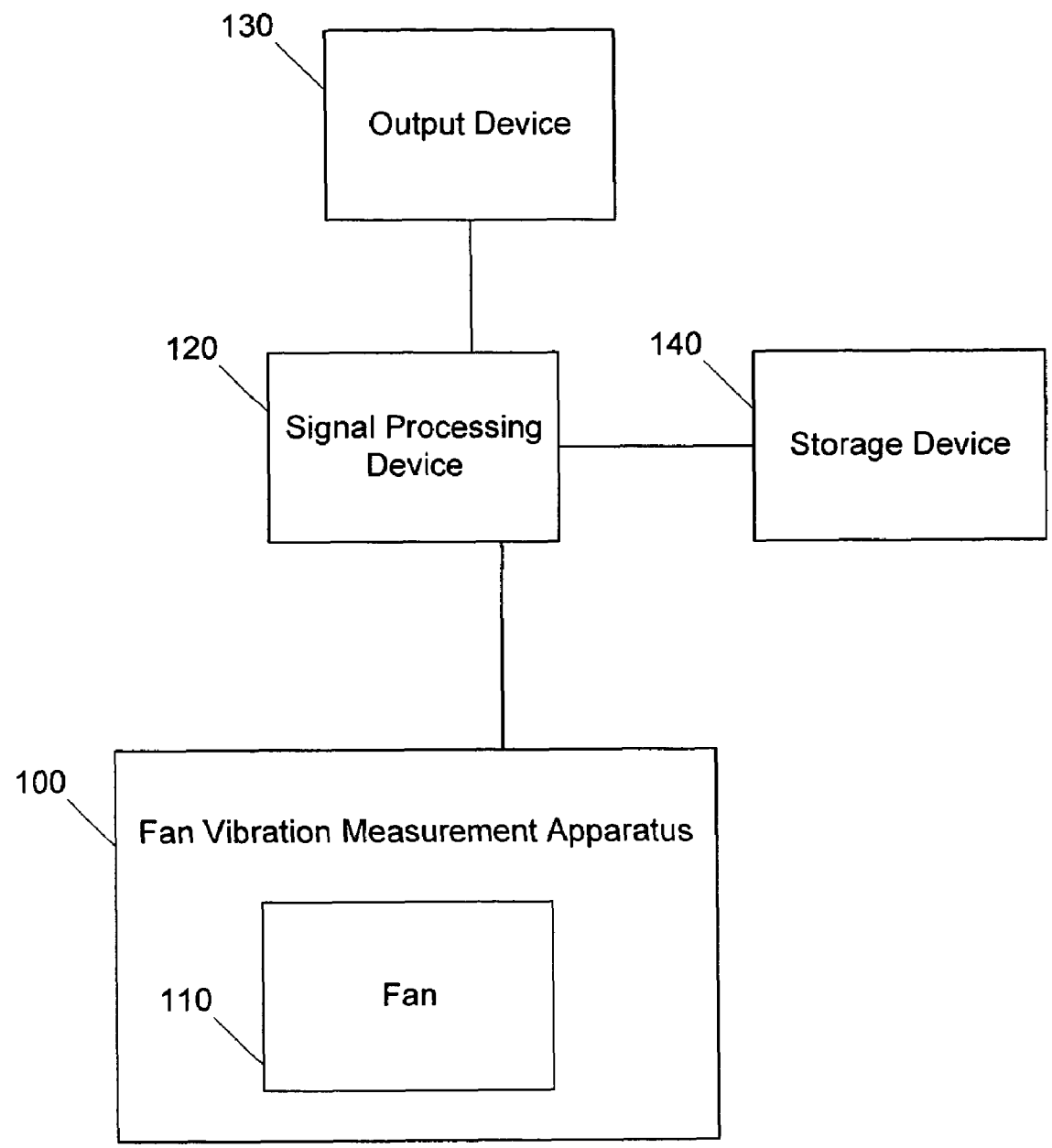
FIG. 1 shows one embodiment of a system for measuring fan vibration.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a system for measuring fan vibration. A fan vibration measurement apparatus 100 has a fan 110 disposed therein. The fan vibration measurement apparatus 100 is connected to a signal-processing device 120. The signal-processing device 120 is connected to an output device 130 and a storage device 140.

Figure 2:
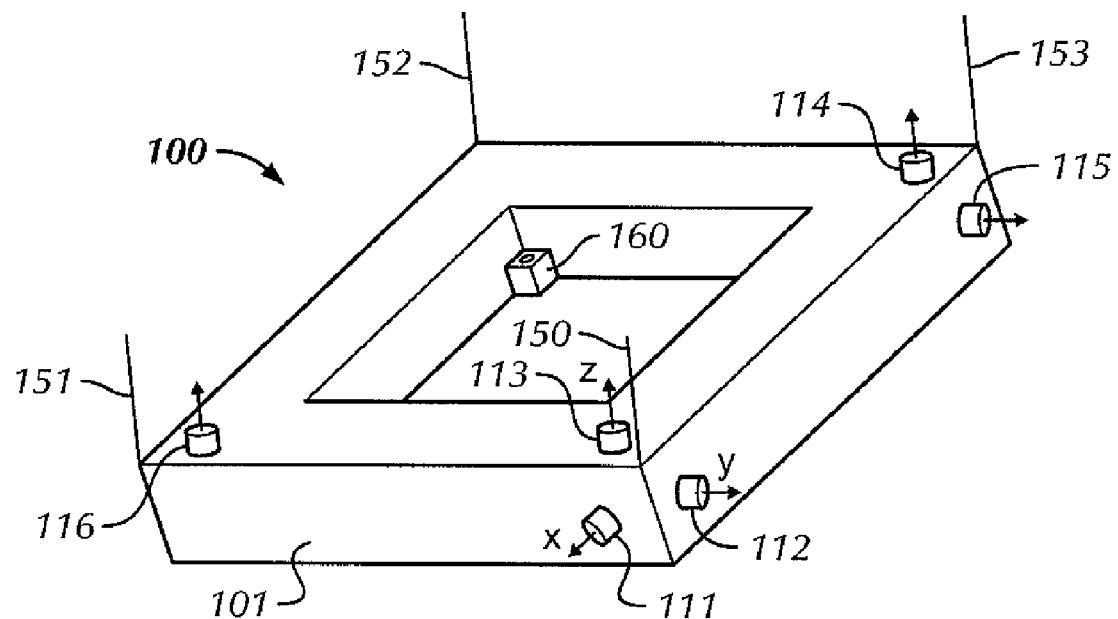
FIG. 2 shows one embodiment of a device for measuring fan vibration.

FIG. 2 shows an apparatus for measuring fan vibration 100 in accordance with one or more embodiments of the present invention. The apparatus 100 has a frame 101, which has an opening at the center, six accelerometers 111-116, and four elastic supports 150-153. Each accelerometer 111-116 is connected to the signal-processing device 120 by a coaxial cable (not shown) or other suitable cable known in the art. There is a mounting block 160 disposed within the opening of the frame 101. The mounting block 160 supports the base of the fan 110 and prevents the fan 110 from passing through the frame 101 upon insertion. Also, the mounting block 160 may include a hole for allowing a screw or bolt to pass through. As will be appreciated by those skilled in the art, typical fan casings often include holes at locations corresponding to holes in a mounting block or other mounting surfaces such that the fan can be secured by screw, bolt and nut, pin, elastic connector, or other suitable connector.

Figure 3:
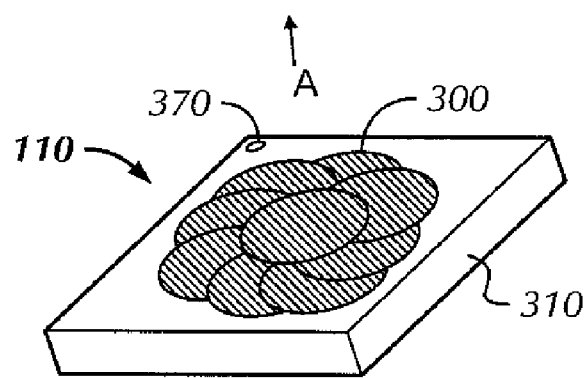
FIG. 3 shows a typical system fan.

FIG. 3 shows a typical fan, which can be tested by an apparatus for measuring fan vibration in FIG. 2. The fan 110 includes a rotor 300 and casing 310. The casing 310 is generally square or rectangular in shape. Those skilled in the art will appreciate that any other shape fan could also be used. Direction A is perpendicular to the surface of the surface of casing 310. Air driven by the fan 110 moves in the direction A. Additionally, the casing 310 may be made of plastic or any other suitable material known in the art. As discussed above, the fan casing 310 may include a hole 370 at one or more locations to allow the fan 110 to be securely mounted by a screw, bolt and nut, pin, elastic connector, or other suitable connector.

Figure 4:
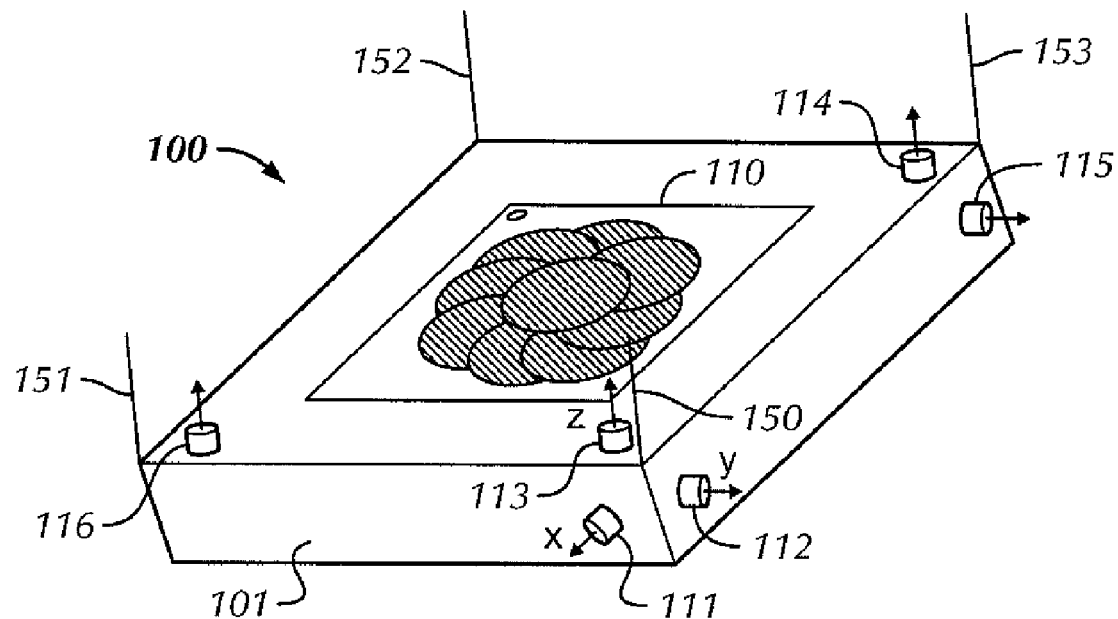
FIG. 4 shows one embodiment of a device for measuring fan vibration with a fan disposed therein.

FIG. 4 shows the fan 110 installed into the opening of the frame 101. The frame 101 is generally square or rectangular in shape. The shape of the frame 101 is selected based on the ease of calculating the mass moments of inertia of the frame 101 and the fan 110 and on the ease of locating the accelerometers 111-116 at a useful distance from each other. For these reasons, a square frame 101 is generally preferred. The frame 101 may be made of a rigid material. The rigid material may be steel, aluminum, or any other suitable material known in the art. In one or more embodiments, the material is five to ten times heavier than the fan 110. The accelerometers 111-116 may be mounted on around the corners of frame 101. Six accelerometers 111-116 are used to detect six-axis information, such as, translational and rotational acceleration in three dimensional directions. This information can be used to determine translational force and rotational torque. Those skilled in the art will appreciate that the number and placement of the accelerometers 111-116 may be varied.

The fan 110 is installed into the opening of the frame 101 rigidly so that force and torque of the fan 110 are transferred without distortion of the dynamic loads. Specifically, the casing 310 is attached, for example, by screw, bolt and nut, pin, elastic connector, or other suitable connector through hole 370 at the corner of the casing 310 and the hole in mounting block 160. Those skilled in the art will appreciate that the number and type of attachment points between the casing 110 and the frame 101 may be varied.

The thickness of the frame in the direction A is almost equal to that of the fan 110 in the direction A. Also, the width of the opening in the frame 101 is almost equal to the width of fan 110 in each direction perpendicular to the direction A. However, so long as the fan 110 is held rigidly in the opening, it is not necessary that the shape of the opening of the frame 101 is exactly matched with the outside shape of the casing 310. However, in one or more embodiments, when installed, the shape of the opening of the frame 101 may be exactly matched with the outside shape of the casing 310 and the casing 310 may be in an interference fit against the frame 101. The fan 110 may be also attached to the frame 101 using any other suitable methods known in the art.

Frame 101 is suspended in the air by elastic supports 150-153, which may be made of, such as, rubber, plastic, or any other suitable material known in the art. One end of each elastic support 150-153 is attached to the corners of frame 101 by tapes, screws, bolts and nuts, adhesives, staking, spot welding, swaging, bonding, or other attachment methods known in the art. In one or more embodiments, duct and adhesive tape or clamping screws are suitable for adjusting the attachment points of each elastic support 150-153 to the frame 101 along the length of each elastic support 150-153. The other end of each elastic support 150-153 is attached to a mounting bracket (not shown) of the fan vibration measurement apparatus 100. The end of each elastic support 150-153 may be attached to the mounting bracket by tapes, screws, bolts and nuts, adhesives, staking, spot welding, swaging, bonding, or other attachment methods known in the art. Because frame 101 is suspended in the air, the structural resonances associated with the elastic attachment to ground are very low in frequency and do not influence the measurements. Although the number of elastic supports 150-153 shown is four, other number of elastic support may be used, so long as the elastic supports suspend the frame 101 and the fan 110 freely in the air. Also, the positions at which elastic supports 150-153 are attached to frame 101 are not limited to those shown. Those skilled in the art will appreciate that the elastic supports 150-153 could be attached to frame 101 at any other position on the surface of the frame 101.

In the embodiment shown, accelerometers 111-116 for three orthogonal directions are disposed around at corners of frame 101, so that there exists a greater distance among each of the accelerometers 111-116 in the same direction. This leads to an improvement in the accuracy of the calculations of torque. Specifically, the accelerometers are disposed on the upper surface, and side surfaces of frame 101 such that motion of the frame 101 in the x-axis, y-axis, and z-axis can be detected. From the output of these accelerometers 111-116, any translation and rotation of fan 110 and the frame 101 can be determined by analog difference and scaling at one of the corners, or at the center of the fan 110. Although the number of the accelerometers shown is six, fewer or more accelerometers can be used. In one or more embodiments, fewer accelerometers may be used to simplify the device, for example, in order to focus on specific torques. In one or more embodiments, more accelerometers may be used in order to increase precision or in order to provide redundancy for error reduction. Also, those skilled in the art will appreciate other positions where the accelerometers 111-116 may be disposed on or within frame 101 in order to measure the motion of fan 110 and the frame 101. In addition, the dimensions of the frame 101 may be chosen in order to minimize inertia error due to the addition of the fan housing, while maintaining adequate rigidity to elevate device resonance frequency and while allowing sufficient device motion to be captured by ordinary sensors.

The signal-processing device 120 is connected electrically to each accelerometer 111-116. The signal-processing device 120 includes a differential amplifier and an FFT device. The differential amplifier adds or subtracts raw analog acceleration waveforms of accelerometers 111-116, and the FFT device generates the spectrum of the combined signals from the differential amplifier. Thus, the signal-processing device 120 converts analog signals from accelerometers 111-116 to forces and torques in spectrum form simply and accurately. In one or more embodiments, the signal-processing device 120 may be a multi-channel dynamic signal analyzer, or any other suitable signal-processing device.

The signal-processing device 120 is electrically connected to the output device 130. The output device 130 may include a display device (not shown), which displays the forces and torques in spectrum form. The output device 130 and signal-processing device 120 may be included together in a single computer capable of the functionality described. In one or more embodiments, the output device 130 outputs the force and torque signals to the display device, and may include software for predicting the impact of the fan vibration on HDDs or other parts of a computer system. Because one output from the signal-processing device 120 is a set of force and torque spectra, this information can directly be used by other analysis software to permit comparisons and simulations of structural response.

The signal-processing device 120 is connected electrically to the storage device 140. The storage device 140 stores the force and torque signals from the signal-processing device 120. The storage device 140 may be a HDD, optical disc drive, or any other suitable storage devices known in the art. The storage device may be included in the processing device 120. The information stored in the storage device 140 is used for further analysis in output device 130, or some other computer or apparatus, to predict the impact of the fan vibration on HDDs or other parts of a computer system.

In operation, the fan 110 is inserted into the opening of frame 101. As shown in FIG. 4, the frame 101 tightly holds the fan 110 at the mounting block 160 and the attachment points of the casing 301 by screw, bolt, or any other suitable methods in the art. Then, the fan 110 is turned on and the fan motor (not shown) starts the rotor 300 rotating. At this time, the frame 101 and the fan 110 are suspended by the elastic supports 150-153 so that the frame 101 and the fan 110 can move freely in the air. As the vibration of the fan 110 increases, each accelerometer 111-116 detects the accelerations from forces and torques and sends the signal to the signal-processing device 120. Then, the signal-processing device 120 converts the signals from accelerometers 111-116 to forces and torques, and then the forces and torques are either stored in the storage device 140 or are displayed on the output device 130.

Figure 5:
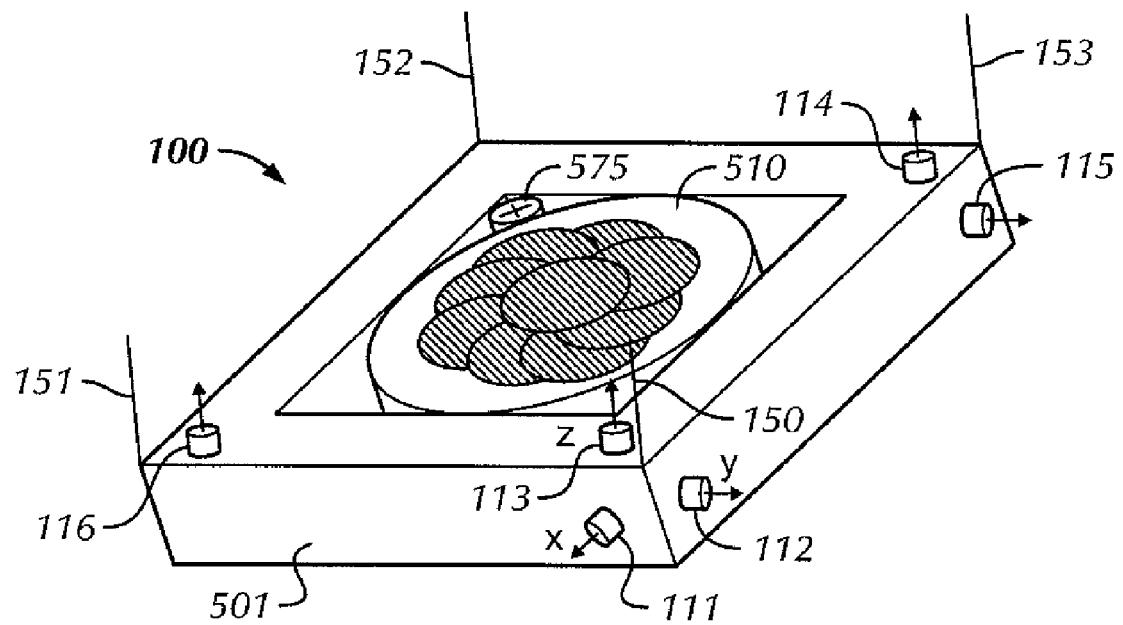
FIG. 5 shows one embodiment of a device for measuring fan vibration with a fan disposed therein.

FIG. 5 shows an apparatus for measuring fan vibration according to one embodiment of the present invention. In the embodiment shown, the opening in the frame 501 is not matched to a fan 510 having a circular shape. In the embodiment shown, fan 510 is mounted to the frame 501 via a screw 575, which passes through a bracket included on fan 510 and the mounting block on frame 501 to secure the fan 510 to the frame 501. Alternatively, a bolt may pass through the bracket and mounting block and secure the fan 510 to the frame 501 with a nut or an elastic connector designed to pass through the bracket and mounting block and secure the fan 510 to the frame 501 made be used. Otherwise, the elements and operation of the fan vibration measurement apparatus 100 are the same as that shown in FIG. 4.

Figure 6:
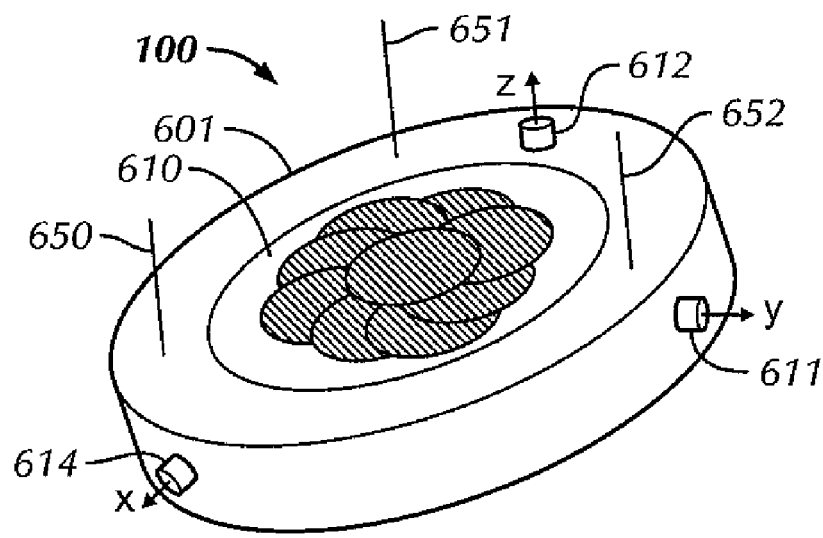
FIG. 6 shows one embodiment of a device for measuring fan vibration with a fan disposed therein.

FIG. 6 shows an apparatus for measuring fan vibration. In the embodiment shown, the opening in the frame 601 is matched to a fan 610 having a circular shape. Furthermore, the frame 601 has a circular shape. Because frame 601 has a circular shape, there are no corners on which to place accelerometers. Instead, accelerometers 611-613 are placed at various positions on the frame 601 such that motion in three dimensions can be detected. Also, elastic supports 650-652 are placed at various locations on frame 601 such that frame 101 and fan 610 can be suspended freely in the air. Otherwise, the operation of the fan vibration measurement apparatus 100 is the same as that shown in FIGS. 4 and 5.

Figure 7:
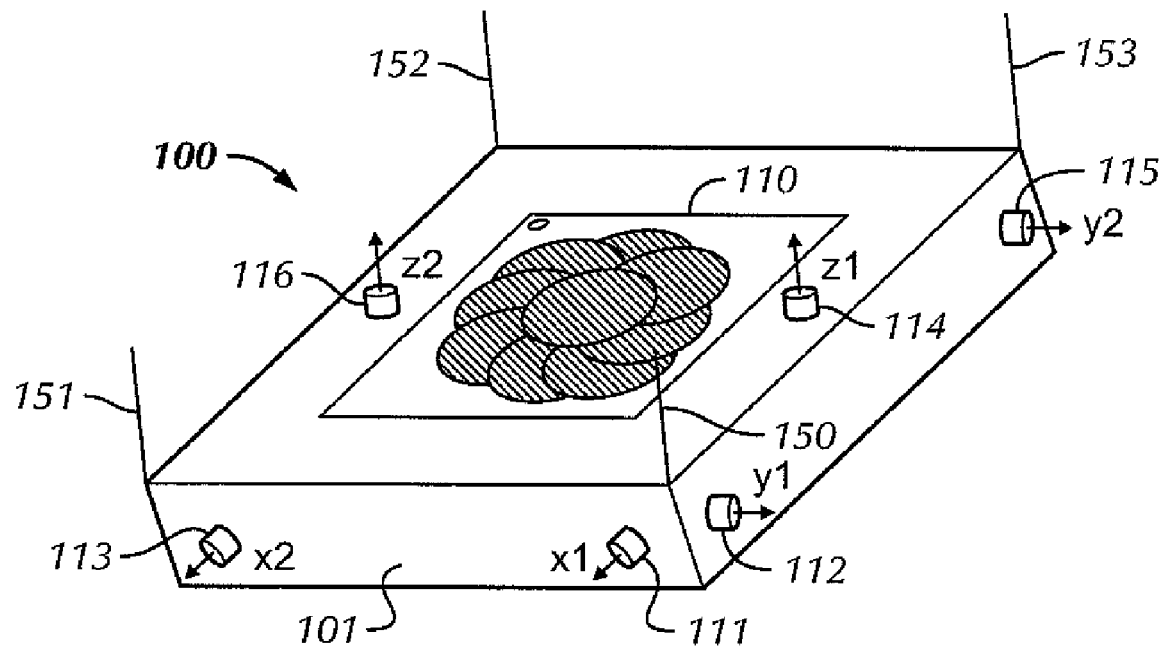
FIG. 7 shows one embodiment of a device for measuring fan vibration with a fan disposed therein.

FIG. 7 shows an apparatus for measuring fan vibration. In the embodiment shown, the accelerometers 111-116 are positioned on the frame 101 to simplify the calculation of forces and torques at the center of the fan. While the geometry discussed with respect to other embodiments favored calculation at the corner of the frame 101, which maps well to fan mount points, the geometry shown in this embodiment favors an idealized origin of forces and torques at the center of the fan. Such a configuration does not correspond to fan mounting points for transfer of the dynamic loads to a system chassis, but rather, is independent of the specific fan mounting schemes and, accordingly, may be useful in different applications. Otherwise, the operation of the fan vibration measurement apparatus 100 is the same as that shown in FIGS. 4-6.

In the embodiment shown, the linear accelerations at the center of the fan are simply the average of the linear accelerations measured in each axis, e.g., $(x1+x2)/2$ in the x-axis. Further, the rotational accelerations are simply the difference between measured accelerations around each axis divided by the distance between the accelerometers, e.g., $(z1-z2)/Dc$, for rotation around the x-axis, where Dc is the distance between accelerometers z1 and z2. The forces and torques are calculated similar as with other embodiments, i.e., by multiplying the accelerations and mass moment of inertia. Those skilled in the art will appreciate that mass moments of inertia are straightforward to calculate around a mass and geometry center.

Methods in accordance with one or more embodiments of the present invention for diagnosing, analyzing, and correcting fan-induced vibration in systems are critical in the early evaluation of systems to avoid these problems, and especially to solve problems which may arise during product development cycles. Mechanical analysis of cooling fans as sources of vibration and the system chassis design as paths of vibration in the time and frequency domains is increasingly important. Measurements of dynamic components, which include forces and torques, in each significant axis are essential to rapid ranking and resolution of fan-induced problems.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for measuring vibration of a fan comprising:
   a frame comprising an opening for enclosing a fan;
   a plurality of accelerometers disposed on the frame;
   an elastic support for supporting the frame; and
   a mounting block,
   wherein the mounting block allows the fan to be secured within the opening of the frame.

2. The apparatus of claim 1, wherein the frame is square.

3. The apparatus of claim 1, wherein the frame is circular.

4. The apparatus of claim 1, wherein the opening is located at a center of the frame.

5. The apparatus of claim 2, wherein one of the plurality of accelerometers is disposed on at least one corner of the frame.

6. The apparatus of claim 2, wherein at least two of the plurality of accelerometers are disposed on at least one corner of the frame.

7. The apparatus of claim 2, wherein at least three of the plurality of accelerometers are disposed on at least one corner of the frame, and wherein the at least three of the plurality of accelerometers are each disposed on a different surface of the at least one corner.

8. The apparatus of claim 1, further comprising a plurality of elastic supports for supporting the frame.

9. The apparatus of claim 1, further comprising a signal-analyzing device, wherein the accelerometers output a signal to the signal-analyzing device.

10. The apparatus of claim 9, further comprising an output device, wherein an analyzed signal is output from the signal-analyzing device to the output device.

11. The apparatus of claim 9, further comprising a storage device, wherein an analyzed signal from the signal-analyzing device is stored in the storage device.

12. The apparatus of claim 1, further comprising a fan, wherein a weight of the frame is greater than a weight of the fan.

13. The apparatus of claim 1, wherein the frame is constructed from a rigid material.

14. An apparatus for measuring fan vibration comprising:
   a frame comprising an opening for enclosing a fan;
   a plurality of accelerometers disposed on the frame, wherein the plurality of accelerometers output a signal to a signal-analyzing device and wherein at least three of the plurality of accelerometers are disposed on a different surface of the frame from each other;
a mounting block that allows the fan to be secured in the opening of the frame; and
an elastic support for supporting the frame.

15. A method of measuring fan vibration comprising:
disposing a plurality of accelerometers on a frame;
mounting a fan within an opening provided at the frame;
securing the fan within the opening by a mounting block disposed at the frame;
turning on the fan; and
outputting a signal from each of the plurality of accelerometers to a signal-analyzing device.

16. The method of measuring fan vibration of claim 15, further comprising:
elastically supporting the frame.

17. The method of measuring fan vibration of claim 15, further comprising:
outputting an analyzed signal from the signal-analyzing device.

18. The method of measuring fan vibration of claim 17, further comprising:
storing the analyzed signal in a storage device.

19. The method of measuring fan vibration of claim 15, further comprising:
disposing at least three of the plurality of accelerometers on a different surface of the frame from each other.

* * * * *